US012049969B2

(12) United States Patent
Vega et al.

(10) Patent No.: US 12,049,969 B2
(45) Date of Patent: Jul. 30, 2024

(54) FLUIDIC CONNECTION DEVICE AND NON-RETURN INSERT VALVE FOR VEHICLES

(71) Applicant: Hutchinson, Paris (FR)

(72) Inventors: Jean Gabriel Vega, Pannes (FR); Albert Camus, Montargis (FR); Thierry Tanguy, Courtempierre (FR)

(73) Assignee: HUTCHINSON, Paris (FR)

( * ) Notice: Subject to any disclaimer, the term of this patent is extended or adjusted under 35 U.S.C. 154(b) by 103 days.

(21) Appl. No.: 17/808,523

(22) Filed: Jun. 23, 2022

(65) Prior Publication Data

US 2022/0412489 A1    Dec. 29, 2022

(30) Foreign Application Priority Data

Jun. 25, 2021   (FR) .................................... 2106839

(51) Int. Cl.
| | |
|---|---|
| *F16L 23/028* | (2006.01) |
| *B60H 1/00* | (2006.01) |
| *F16L 23/00* | (2006.01) |
| *F16L 23/036* | (2006.01) |
| *F16L 23/16* | (2006.01) |

(52) U.S. Cl.
CPC ........ *F16L 23/028* (2013.01); *B60H 1/00485* (2013.01); *B60H 1/00571* (2013.01); *F16L 23/006* (2013.01); *F16L 23/036* (2013.01); *F16L 23/162* (2013.01)

(58) Field of Classification Search
CPC ..... F16L 23/006; F16L 23/028; F16L 23/036; F16L 13/147; F16L 23/162; F16L 21/08; F16L 23/032; F16L 23/003; B60H 1/00571; B60H 1/00485
See application file for complete search history.

(56) References Cited

U.S. PATENT DOCUMENTS

| | | | |
|---|---|---|---|
| 2,960,998 A | 11/1960 | Sinker et al. | |
| 3,001,804 A * | 9/1961 | Tomlinson | ............... F16L 27/12 285/137.11 |
| 3,995,658 A * | 12/1976 | Hager | ................... F16K 15/063 137/543 |
| 4,862,913 A | 9/1989 | Wildfang | |
| 4,955,407 A | 9/1990 | Inoue | |
| 4,991,882 A * | 2/1991 | Gahwiler | ............... F16L 37/084 285/423 |
| 5,556,138 A * | 9/1996 | Nakajima | ............... F16L 39/00 285/415 |

(Continued)

FOREIGN PATENT DOCUMENTS

| | | |
|---|---|---|
| CH | 629581 A5 | 4/1982 |
| DE | 19501780 A1 | 8/1995 |

(Continued)

*Primary Examiner* — David Colon-Morales
(74) *Attorney, Agent, or Firm* — BROWDY AND NEIMARK, P.L.L.C.

(57) ABSTRACT

A fluidic connection device (10) for a fluid circuit, in particular of a vehicle, this device comprising a first pipe (12), a tubular end-piece engaged in the first pipe (12), a first flange (16) mounted around the first pipe (12), a second flange (18) mounted around the end-piece, at least one element (20) for attaching the first and second flanges (16, 18) one against the other, and a non-return insert valve (100) mounted within the first pipe (12).

13 Claims, 13 Drawing Sheets

(56) References Cited

U.S. PATENT DOCUMENTS

| | | | | |
|---|---|---|---|---|
| 5,853,201 | A * | 12/1998 | Izumi | B60H 1/00571 |
| | | | | 285/179 |
| 6,106,030 | A * | 8/2000 | Nader | F16L 23/0283 |
| | | | | 277/648 |
| 6,386,593 | B1 * | 5/2002 | Slais | F16J 15/0818 |
| | | | | 277/609 |
| 6,443,502 | B1 * | 9/2002 | Iida | F25B 41/40 |
| | | | | 285/918 |
| 6,676,167 | B2 * | 1/2004 | Schroeder | F16L 41/086 |
| | | | | 285/368 |
| 6,834,893 | B2 * | 12/2004 | Schroeder | F16L 21/08 |
| | | | | 285/368 |
| 6,893,052 | B2 * | 5/2005 | Wildermuth | F16L 23/20 |
| | | | | 285/379 |
| 6,908,117 | B1 * | 6/2005 | Pickett, Jr. | F16L 41/086 |
| | | | | 285/137.11 |
| 7,431,048 | B2 * | 10/2008 | Fangmeier | F16K 15/063 |
| | | | | 137/542 |
| 7,540,539 | B2 * | 6/2009 | Fujiwara | F16L 41/086 |
| | | | | 285/205 |
| 7,766,391 | B2 * | 8/2010 | Kim | B60H 1/00571 |
| | | | | 285/379 |
| 8,408,244 | B2 * | 4/2013 | Gilcher | E03C 1/104 |
| | | | | 137/454.2 |
| 9,315,977 | B1 * | 4/2016 | Gass | F16K 15/063 |
| 9,404,244 | B1 * | 8/2016 | Gass | E03B 7/077 |
| 9,568,128 | B2 * | 2/2017 | Okada | F16L 23/003 |
| 9,599,242 | B2 * | 3/2017 | Wu | F16K 15/063 |
| 9,644,356 | B1 * | 5/2017 | Gass | E03B 7/078 |
| 9,777,850 | B1 * | 10/2017 | Handley | F16K 1/427 |
| 9,777,878 | B2 * | 10/2017 | Kesler | B60H 1/00571 |
| 9,869,402 | B2 * | 1/2018 | Ho | F16K 15/063 |
| 10,060,108 | B2 * | 8/2018 | Hauth | F16K 27/0209 |
| 10,428,963 | B2 * | 10/2019 | Barreda | F16K 15/063 |
| 11,231,118 | B1 * | 1/2022 | Kubricky | F16K 15/063 |
| 2006/0011238 | A1 | 1/2006 | Fangmeier | |
| 2006/0260684 | A1 | 11/2006 | Fangmeier | |
| 2008/0106095 | A1 * | 5/2008 | Harris | F28F 9/0246 |
| | | | | 285/179 |
| 2019/0063646 | A1 * | 2/2019 | Bopp | F16L 37/008 |
| 2022/0235891 | A1 * | 7/2022 | Slais | F16L 23/028 |
| 2022/0412469 | A1 * | 12/2022 | Vega | F16K 15/067 |

FOREIGN PATENT DOCUMENTS

| | | |
|---|---|---|
| DE | 102015217786 A1 * | 3/2017 |
| FR | 2755743 A1 | 5/1998 |

* cited by examiner

[Fig.1]
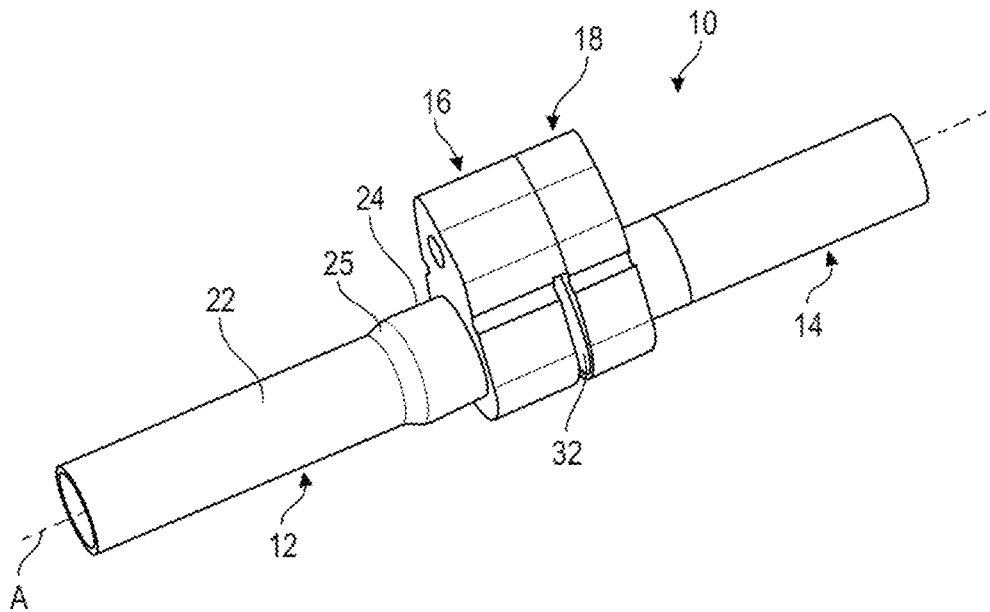
[Fig.2]
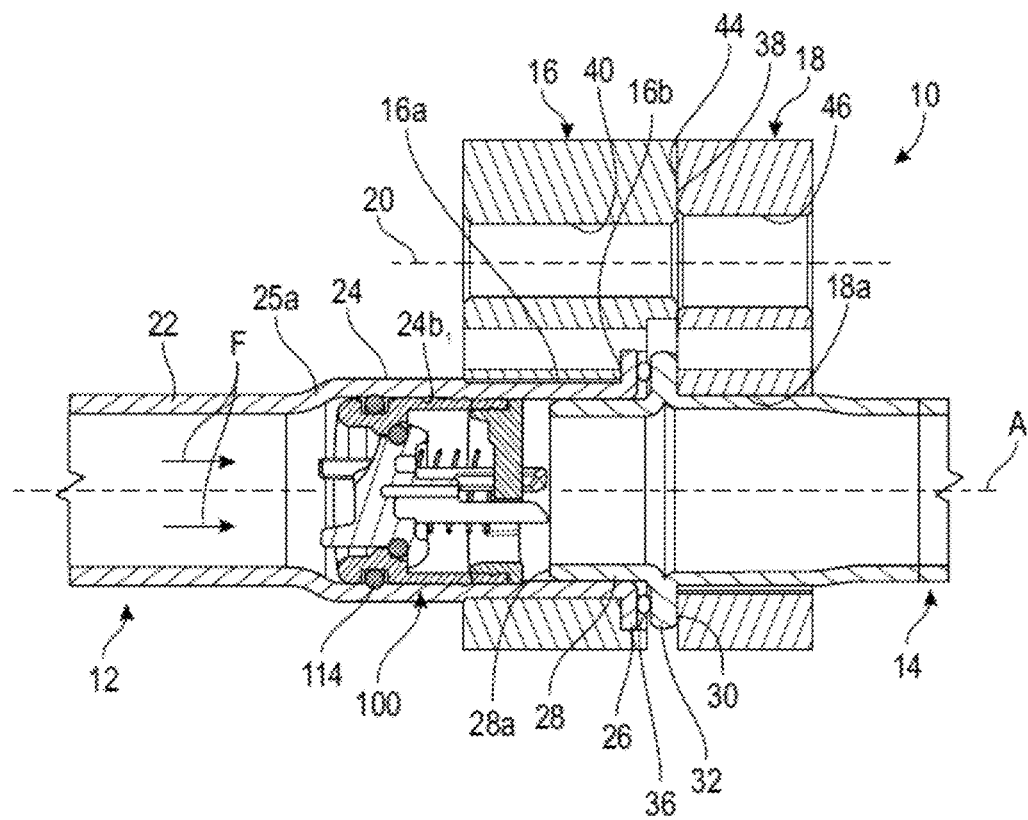

[Fig.3]
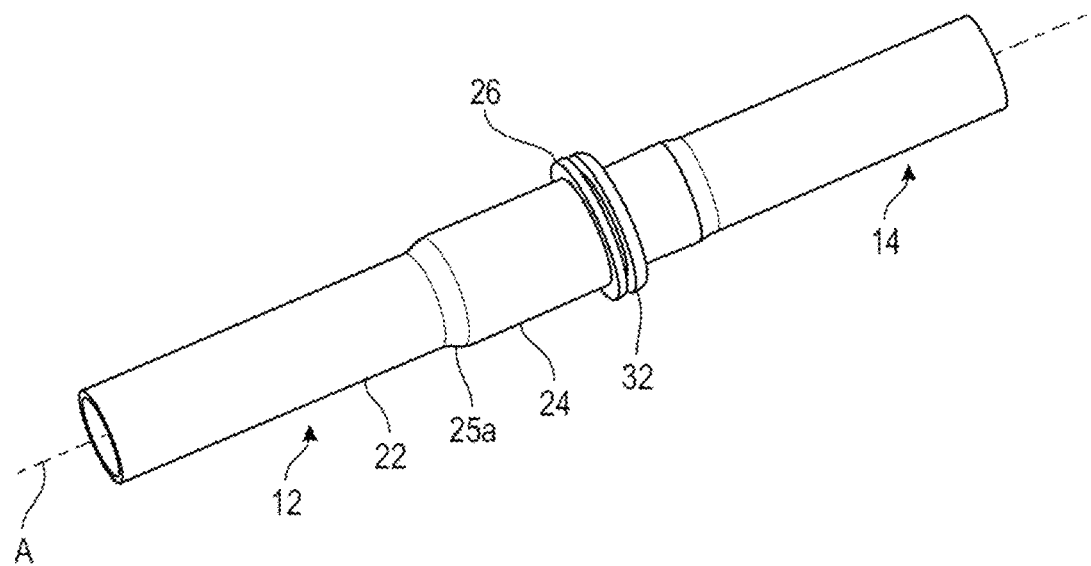
[Fig.4]
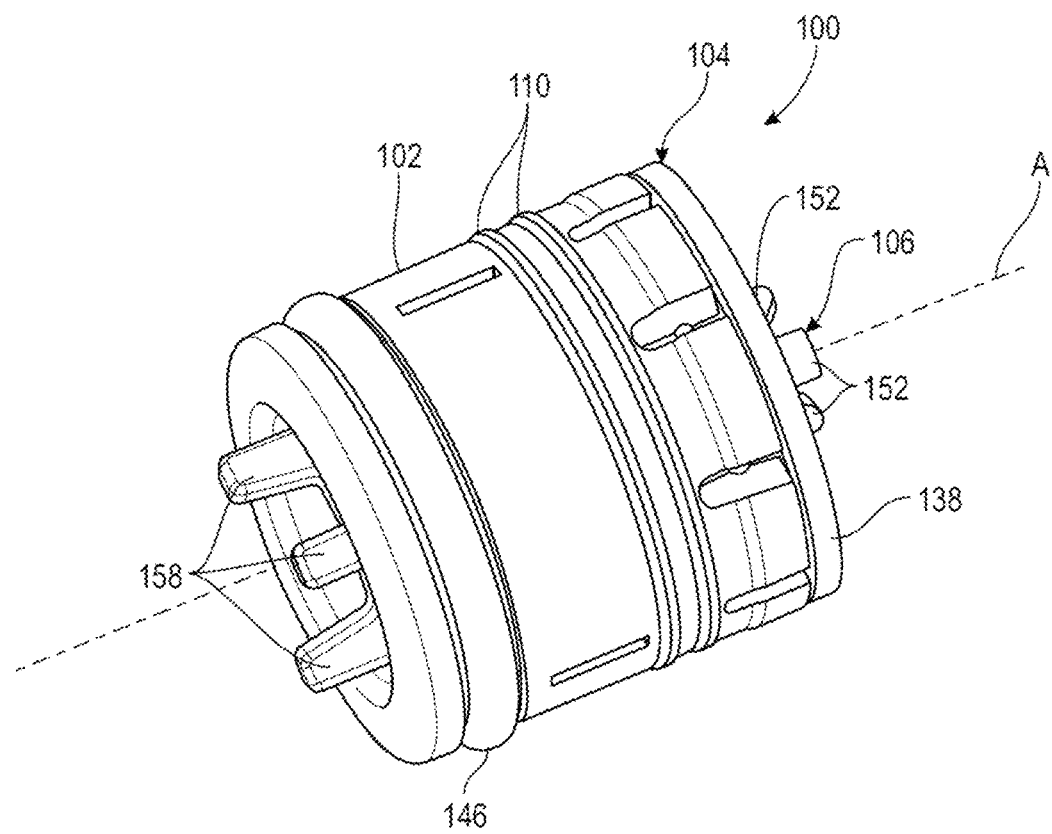

[Fig.5]
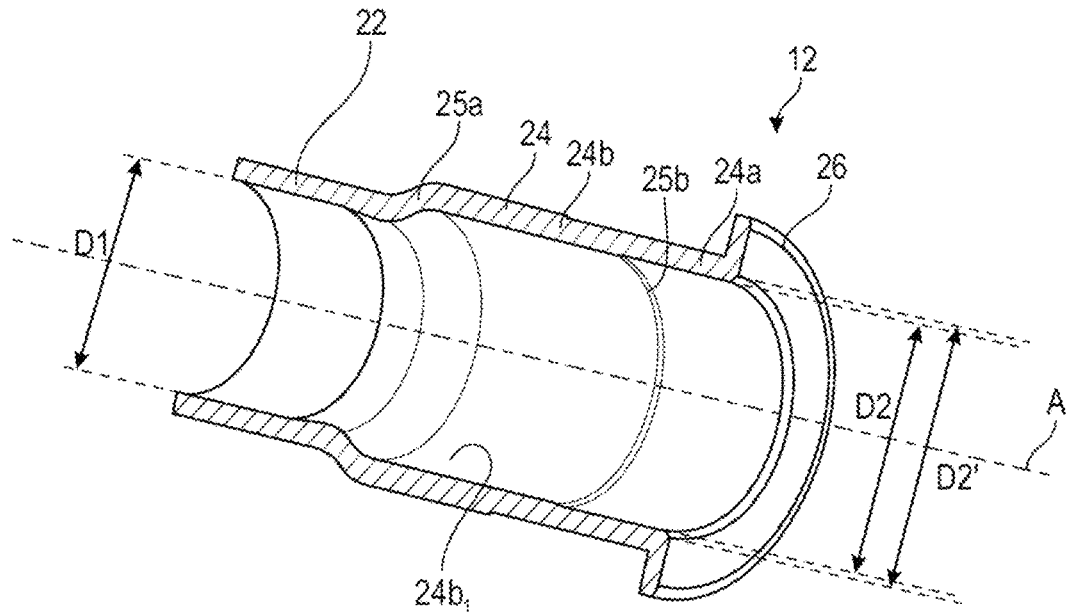
[Fig.6]
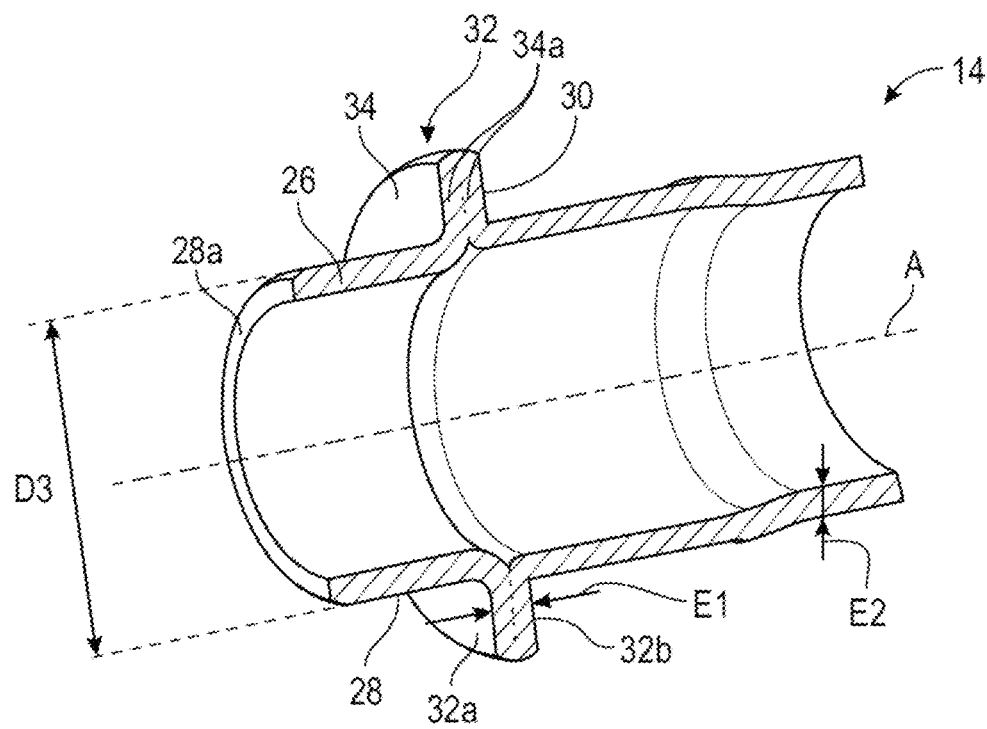

[Fig.7]
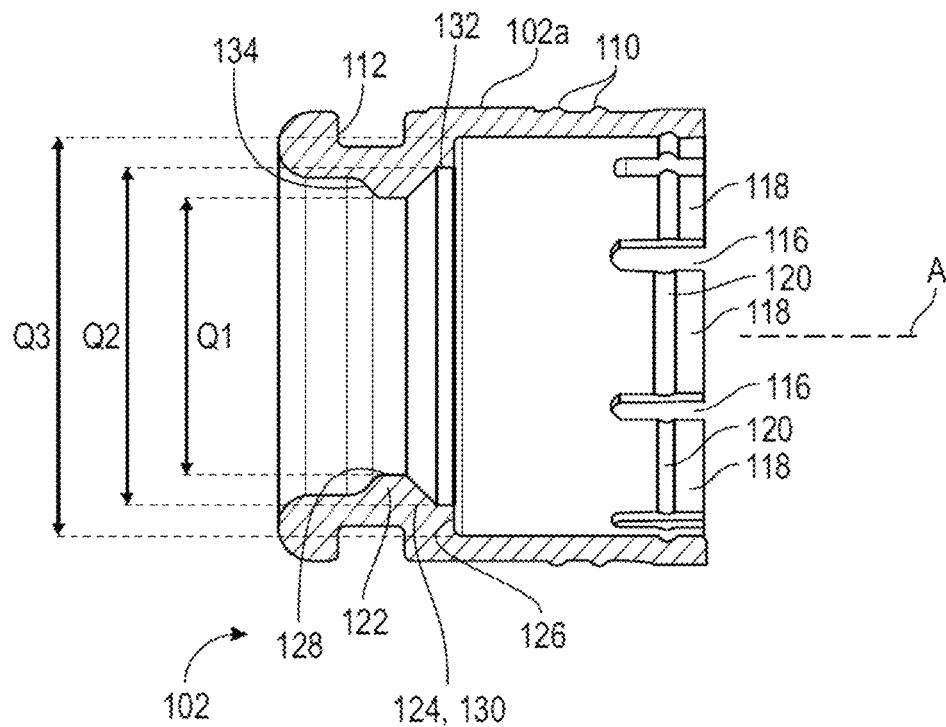
[Fig.8]
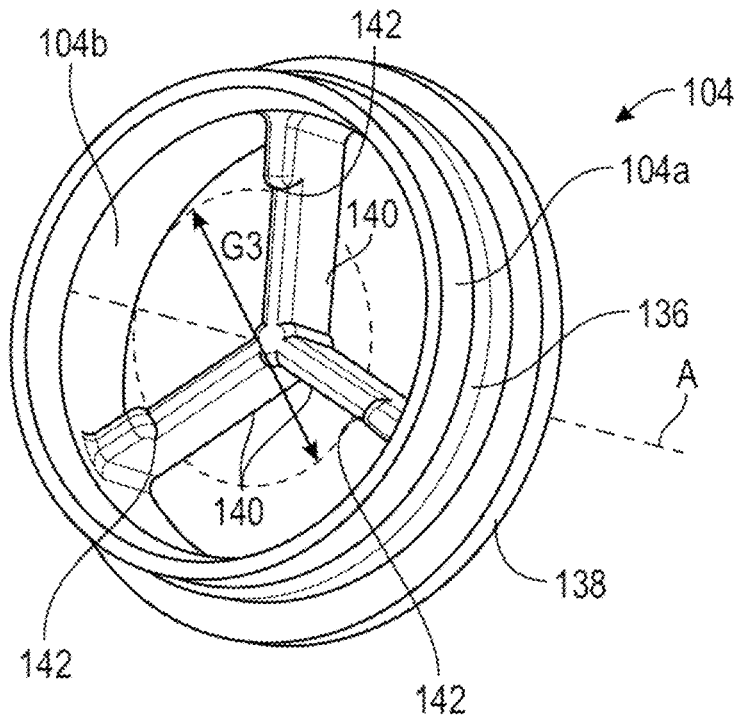

[Fig.9]
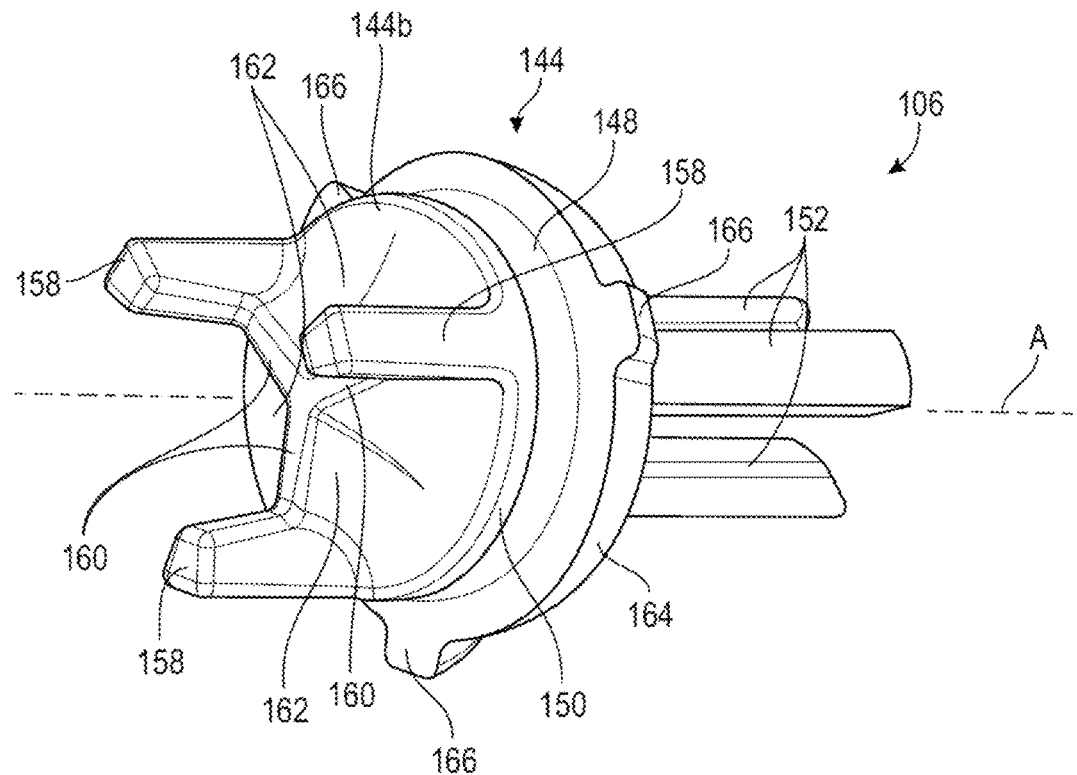
[Fig.10]
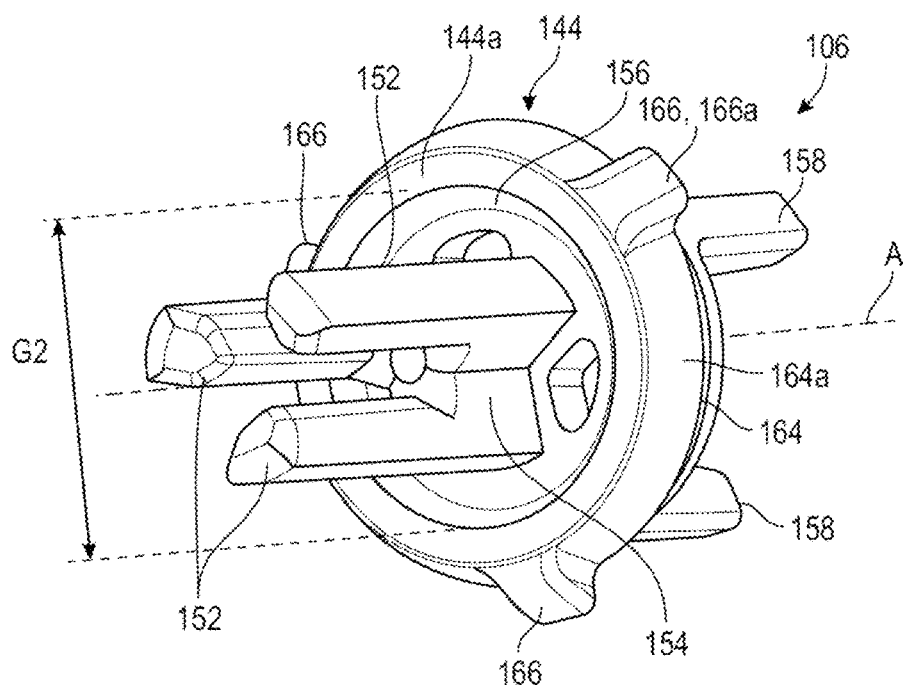

[Fig.11]
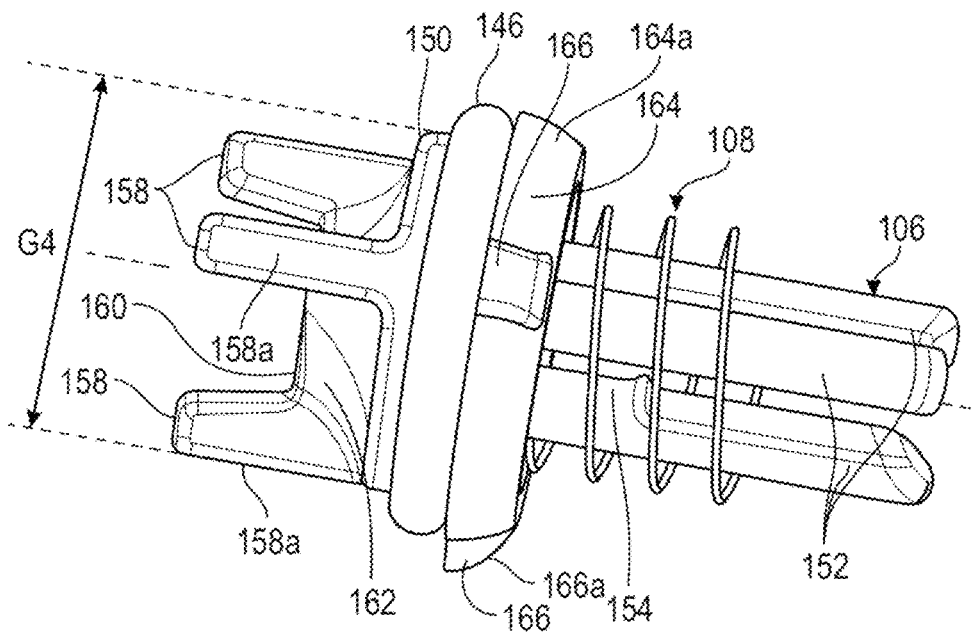
[Fig.12]
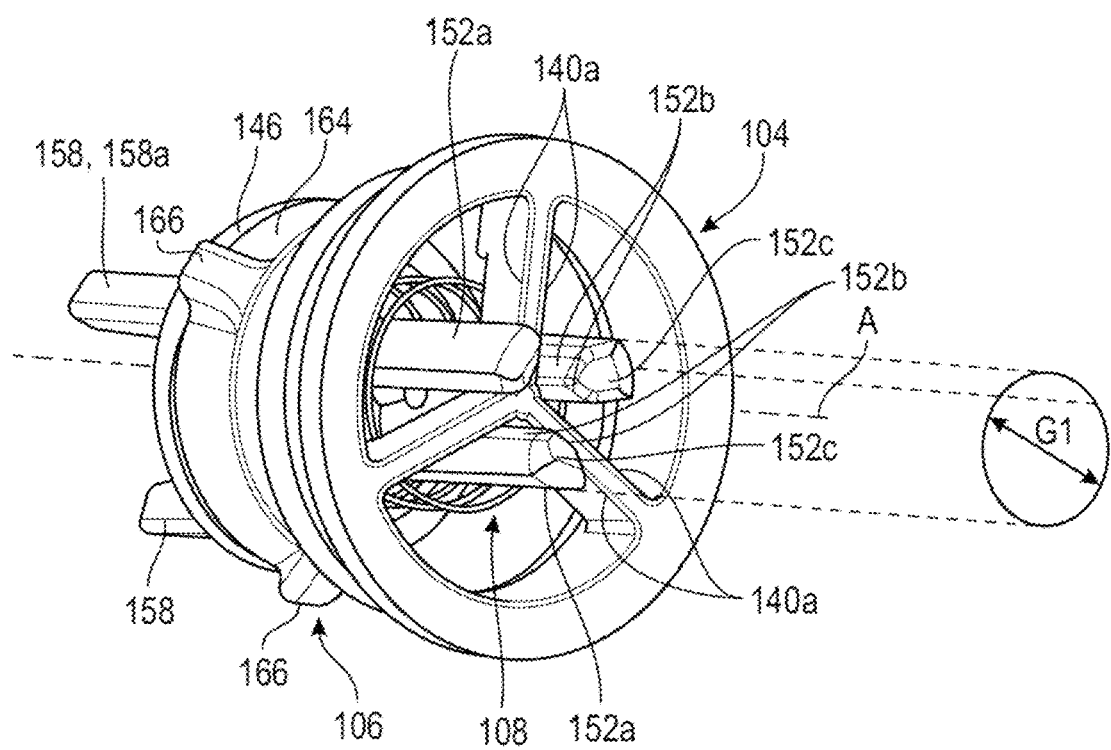

[Fig.13]
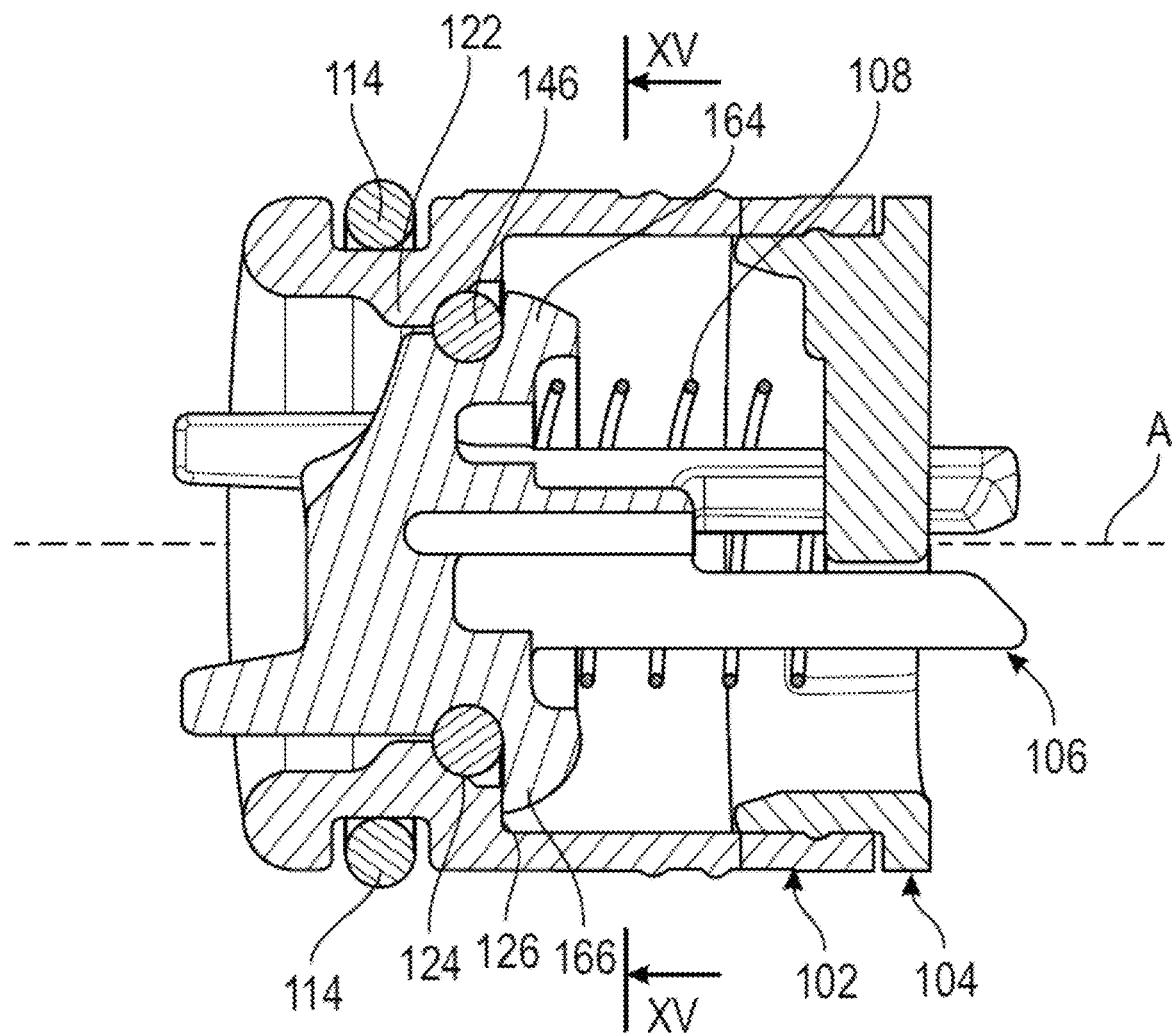

[Fig.14]
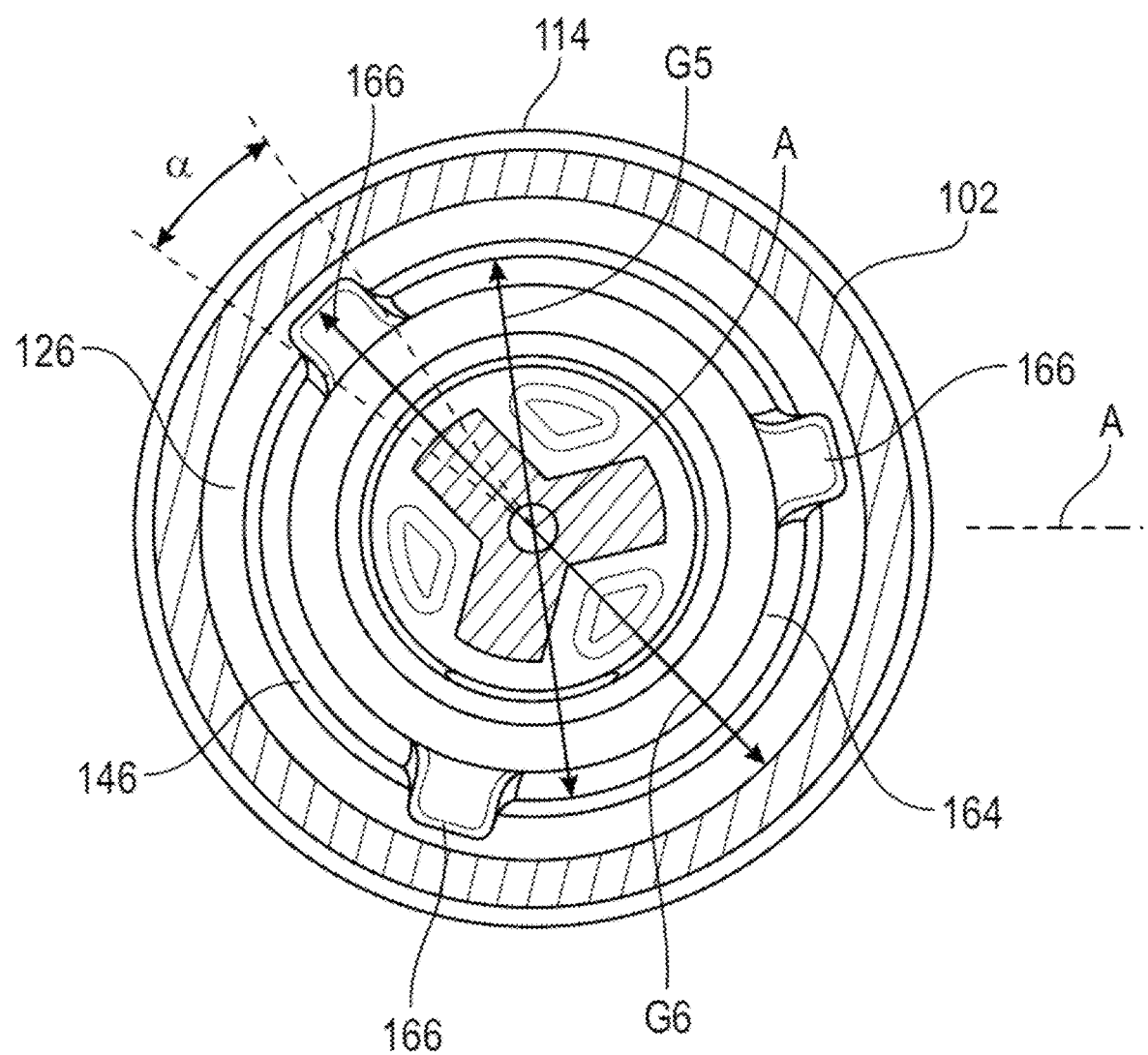

[Fig.15]
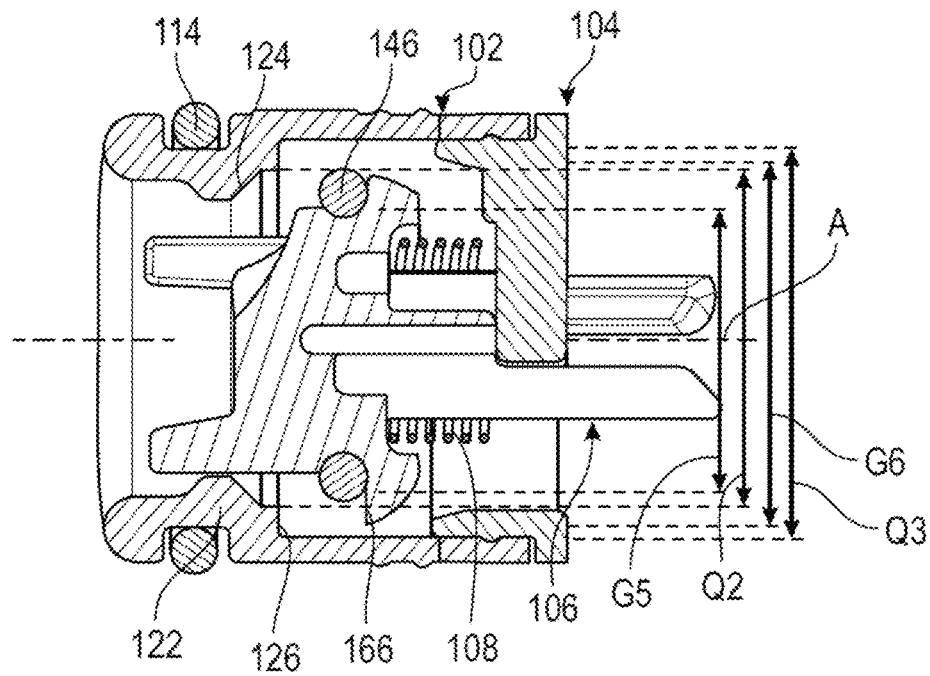
[Fig.16]
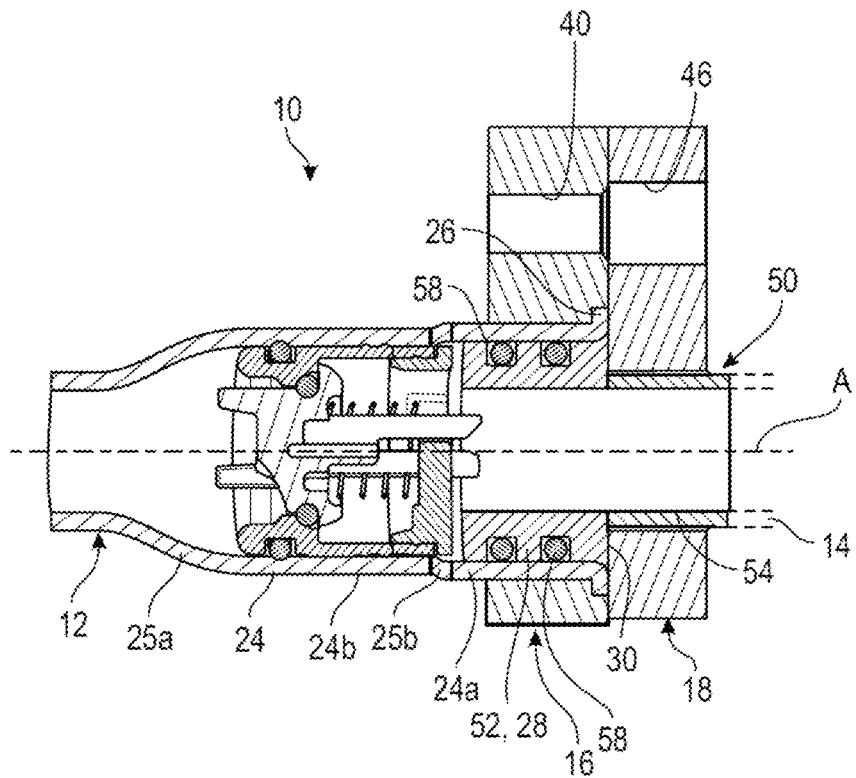

[Fig.17]
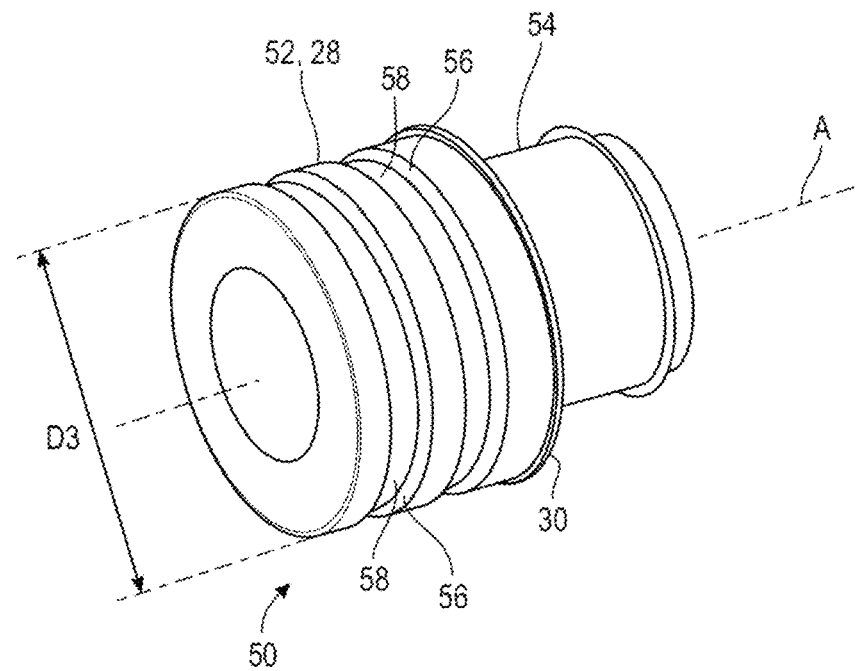
[Fig.18]
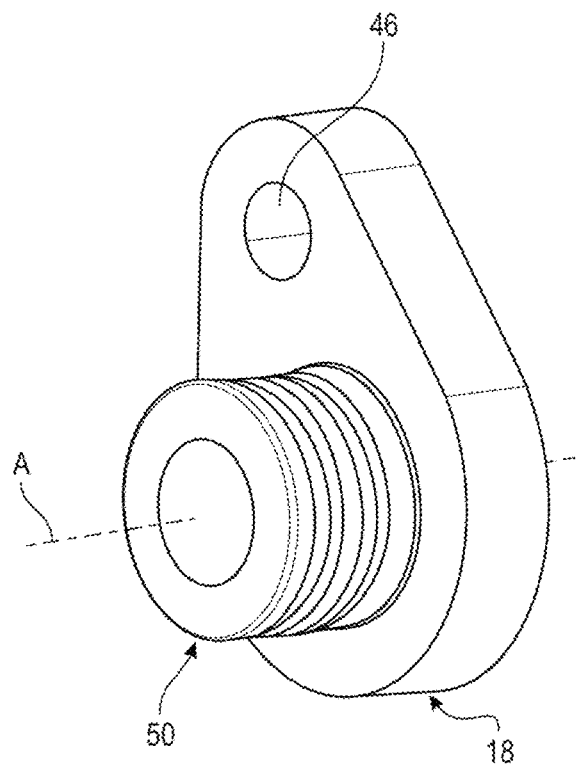

[Fig.19]
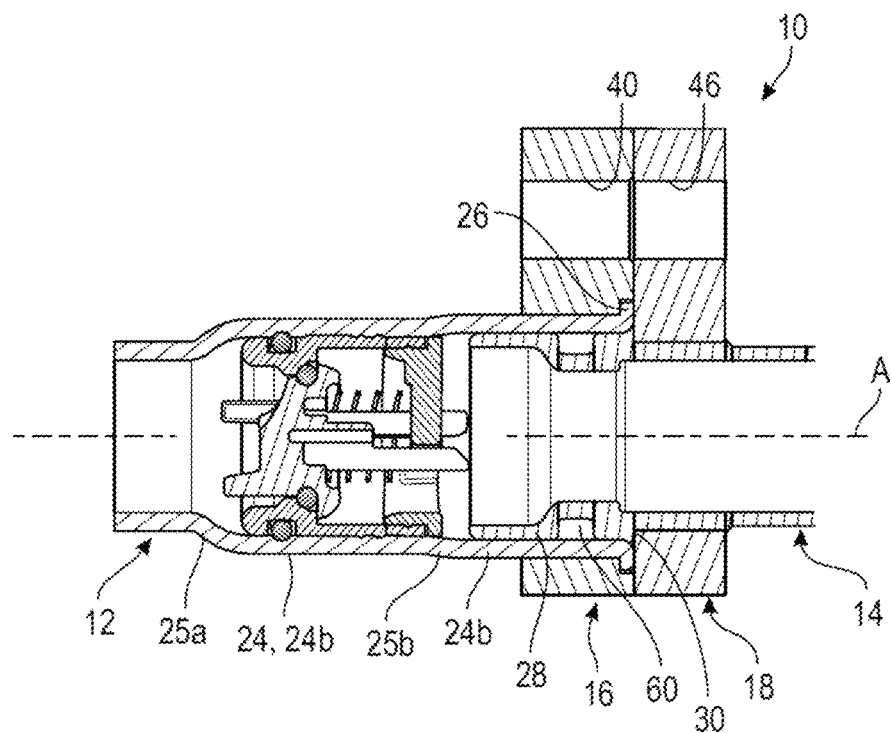
[Fig.20]
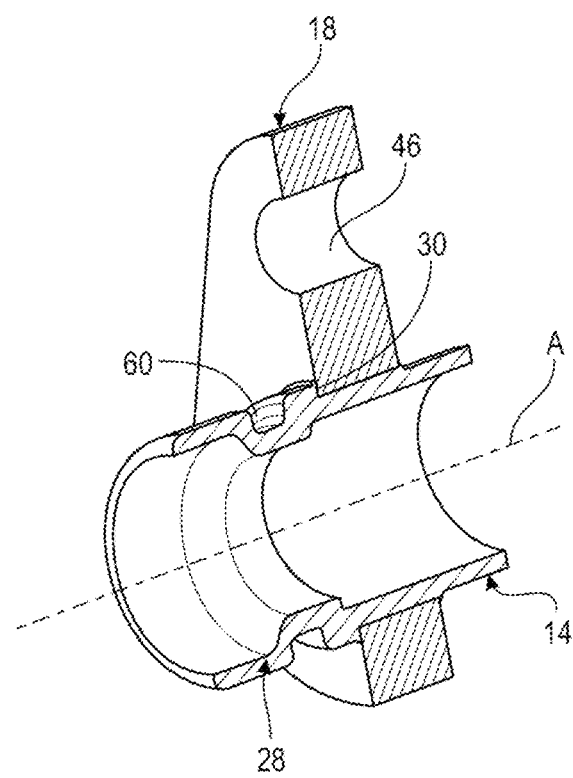

[Fig.21]
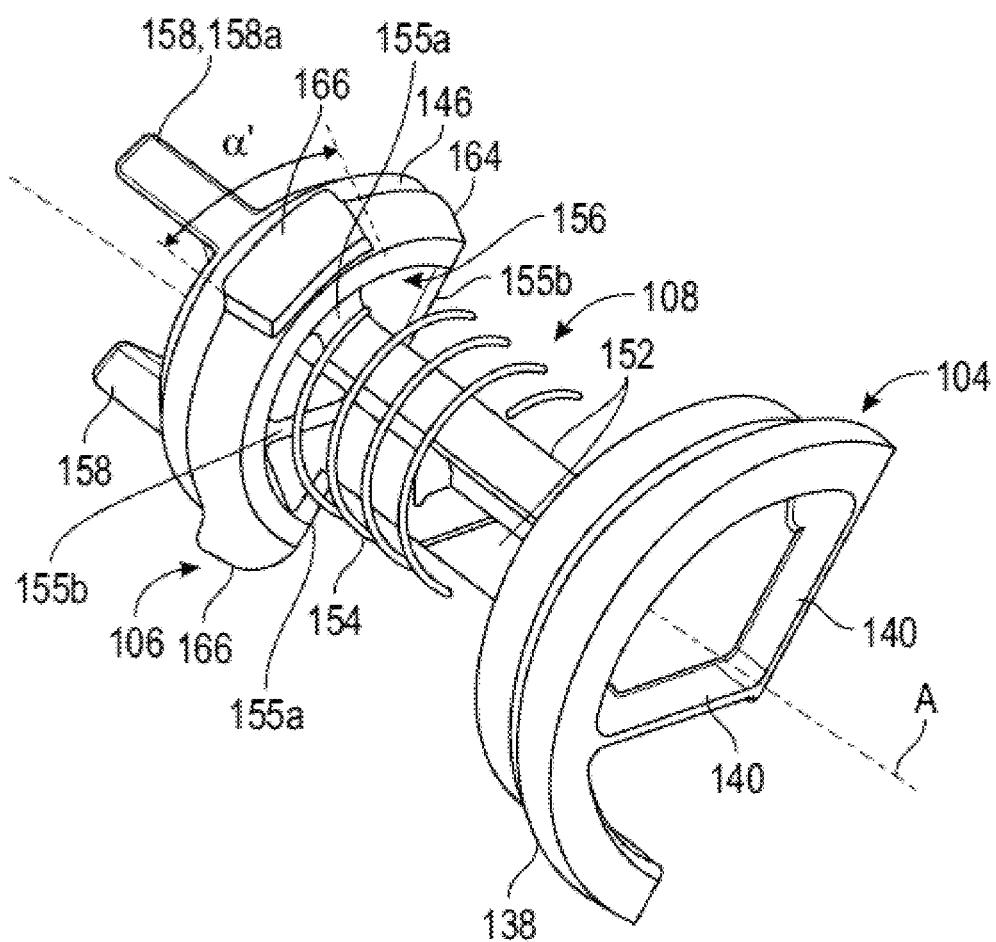

[Fig.22]
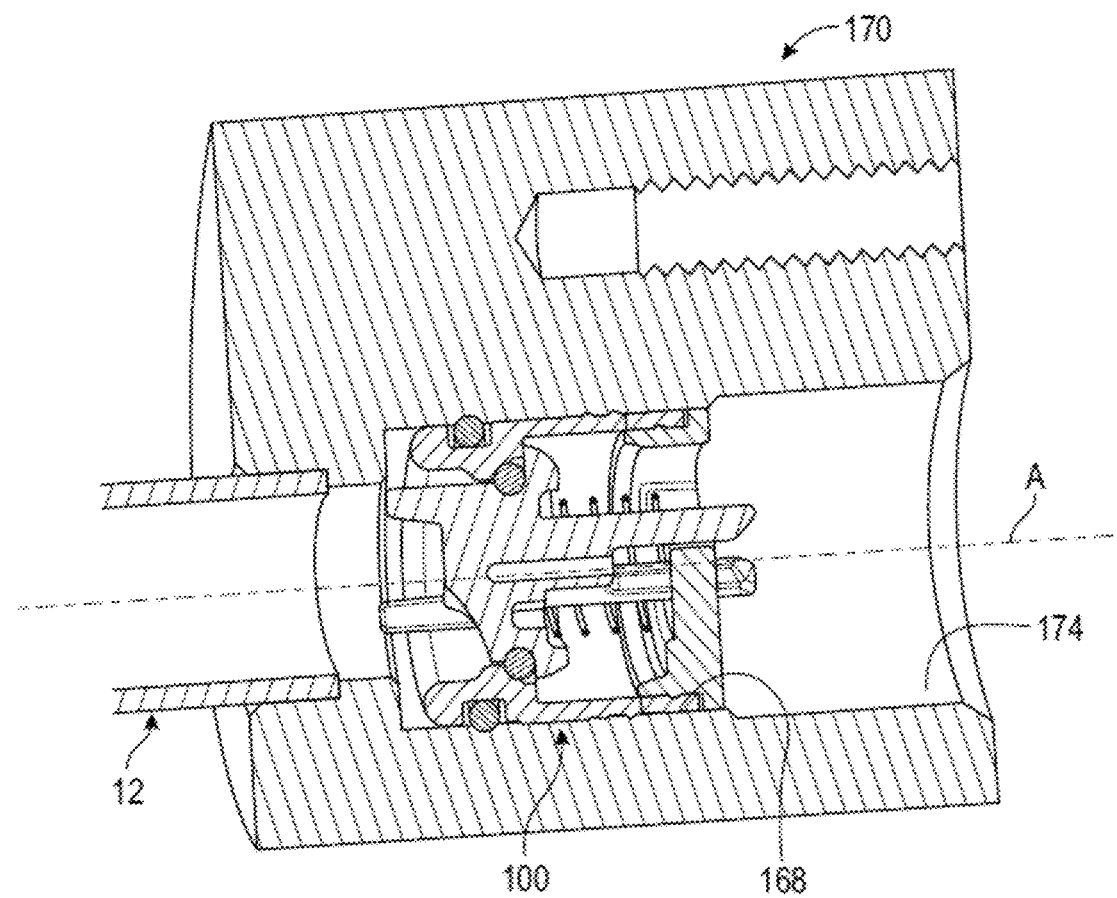

FLUIDIC CONNECTION DEVICE AND NON-RETURN INSERT VALVE FOR VEHICLES

TECHNICAL FIELD OF THE INVENTION

The present invention relates to a fluidic connection device and a non-return insert valve for a fluid circuit, in particular of a vehicle.

TECHNICAL BACKGROUND

The technical background comprises in particular the documents U.S. Pat. No. 6,676,167-B2, FR-2755743-A1, CH-629581-A5, and DE-19501780-A1.

A vehicle, in particular a car, comprises several fluid circuits which are equipped with fluidic connection devices and non-return valves.

A non-return valve is known to be associated with a fluidic connection device, this device comprising for example a body in which the non-return valve is mounted. The body is intended to be attached to an end of a first pipe and comprises an annular flange for attaching to an annular flange mounted on an end of a second pipe.

This device ensures the fluidic connection of the pipes, and can comprise seals to ensure a sealing of this connection.

The non-return valve is configured to allow the flow of a fluid through the pipes in one direction and to prevent the flow of this fluid in the opposite direction.

The present invention proposes a simple, effective and economical improvement to the existing technology.

SUMMARY OF THE INVENTION

According to a first aspect, the invention relates to a fluidic connection device for a fluid circuit, in particular of a vehicle, said device comprising:
- a first pipe comprising a main section of internal diameter D1 and a secondary section having at least one internal diameter D2 greater than D1, the secondary section being located at one end of the first pipe and connected to the main section by a first shrinkage, this first pipe being made of a plastically deformable material and comprising a first external annular collar,
- a tubular end-piece comprising an end section of external diameter D3 which is configured to be engaged along an axis in the secondary section of the first pipe, this end-piece comprising an external cylindrical shoulder,
- a first flange mounted around the secondary section of the first pipe and comprising a first orifice crossed by this secondary section, this first flange being configured to be supported axially on the first collar,
- a second flange mounted around the end-piece and comprising a second orifice crossed by the end-piece, this second flange being configured to be supported axially on the cylindrical shoulder, the first and second flanges being configured to be tightened one against the other in a connecting plane substantially perpendicular to said axis so as to bring the first collar closer to said cylindrical shoulder and to maintain the end-piece engaged in the first pipe,
- at least one element for attaching the first and second flanges one against the other, and
- a non-return insert valve mounted within said secondary section, and located axially between said first shrinkage and said end section.

The present invention proposes the connection of a first pipe to a tubular end-piece, which may itself be a second pipe, by means of flanges. This device is equipped with a non-return valve which has the particularity of being insertable, i.e. it forms an insert inside the first pipe. In other words, the valve is not integrated or inserted in a body of the device that is independent of the pipes but is instead directly inserted in one of the pipes. For this purpose, the first pipe preferably has its internal diameter enlarged to accommodate the valve. The valve is axially interposed between the shrinkage of the first pipe and the tubular end-piece (or the second pipe) and is thus prevented from exiting the first pipe.

The device according to the invention may comprise one or more of the following characteristics, taken alone or in combination with each other:
- the first collar is located at a free end of said secondary section;
- an annular seal is axially interposed and tightened between the first collar and the end-piece;
- the first collar is obtained by plastic deformation of the free end of said secondary section;
- said end-piece is fitted and attached to an end of a second pipe;
- said second flange is crimped to said end-piece;
- said end-piece is integral with a second pipe which is made of a plastically deformable material;
- said cylindrical shoulder is formed by a second external annular collar located at an axial distance from a free end of said end section;
- said second collar is obtained by plastic deformation of the second pipe, this collar being formed by an external annular swelling, the facing annular walls of which are axially tightened one against the other so that the second collar has an axial thickness greater than a radial thickness of the second pipe;
- said end section comprises at least one external annular gorge for housing an annular seal configured to cooperate with an internal annular surface of said secondary section;
- said at least one gorge is obtained by plastic deformation of the end section;
- said at least one attachment element comprises a screw or a bolt that passes through holes facing said first and second flanges;
- said secondary section comprises a first segment of internal diameter D2' greater than D1, and a second segment of internal diameter D2 located between the main section and said first segment, D2 being greater than D1 and less than D2';
- said first and second segments are connected together by a second shrinkage of the first pipe;
- the valve is mounted within the second segment and the end section is mounted within the first segment;
- each flange is a one-piece;
- the first pipe, and/or the second pipe, and/or the end-piece, is/are made of metal and for example of aluminium.

The present invention also relates to a fluid circuit for a vehicle, comprising at least one fluidic connection device as described above.

The present invention also relates to a vehicle, comprising at least one device or a fluid circuit as described above.

According to a second aspect, the invention relates to a non-return insert valve for a fluid circuit, in particular of a vehicle, said valve being configured to be inserted into a pipe and comprising:

a tubular body having a main axis A and comprising an external cylindrical surface configured to be surrounded by an internal cylindrical surface of the pipe, this body comprising an internal annular rim and an internal annular seat, a ring mounted at least partly in or on said body and comprising guides extending in a radial direction with respect to said axis A, a piston mounted in said body and comprising a head carrying a first annular seal configured to come in support on said seat, the piston comprising a first side and tabs extending axially from this first side and configured to slidably cooperate with said guides, the piston further comprising a second, opposite side and fingers extending axially from this second side and configured to slidably cooperate with an internal periphery of said rim, and an elastically deformable member mounted between the head and the ring and configured to bias the seal in axial support against said seat, said piston being axially movable from a closed position of the valve in which the first seal is in axial support on said seat, to an open position of the valve in which the first seal is axially spaced from said seat, this displacement being intended to be caused by a fluid which is intended to apply a force on said second side, which is greater than an elastic return force imposed by said member, said head comprising at its external periphery lugs which extend in a radial direction with respect to said axis and which are configured to be supported axially against an internal cylindrical shoulder of said body, when the piston is in said first position, in order to precisely define this first position, the fluid being intended to flow between these lugs when the piston is in said second position.

The valve according to the invention is designed to optimize the flow of the fluid by limiting turbulence and pressure losses. For this purpose, the piston of the valve comprises radial lugs between which the fluid can flow. The inventors have found that the use of such lugs is advantageous over the use of an external annular rib extending 360°, to optimize the passage cross-section area of the fluid while limiting turbulence in the flow of the fluid. This allows to improve the pressure losses of the valve and thus the energy efficiency of the circuit. These lugs are configured to be supported axially on the body of the valve to accurately and positively define the rest position of the piston in the valve. In this position, the seal is supported on the seat and ensure the sealing of the valve in closed position.

In addition, the elastic member allows to maintain the seal on its seat and limits the vibrations of the piston during operation, which can generate noise in certain transient phases. These vibrations can propagate and create noise pollution in the passenger compartment of the vehicle, for example. The presence of this member also allows to ensure the sealing of the valve in case of small pressure difference between the upstream and the downstream of the piston or if the valve is mounted vertically. Leaks in the valve would increase the energy consumption of the circuit.

The valve according to the invention may comprise one or more of the following characteristics, taken alone or in combination with each other:

the tubular body is made of plastic material and/or the ring is made of plastic material or metal;

the ring is engaged in or on the body by elastic snap-fit;

the body comprises, at one axial end, radial notches defining between them lips that are elastically deformable in the radial direction, the ring being intended to be at least partly surrounded by these lips;

the external cylindrical surface of the body comprises at least one annular rib for anchoring in said pipe;

the external cylindrical surface of the body comprises at least one external annular gorge, the valve further comprising at least a second annular seal mounted in this gorge;

said seat is formed by a frustoconical surface located on one side of said rim and/or between this rim and said shoulder;

said fingers are located at an external periphery of said second side and are each connected to an edge projecting from said second side, said edges extending radially with respect to the axis A from said fingers and meeting at the level of said axis A; said second side is thus profiled to limit turbulence and pressure losses in the flow of the fluid;

said edges are connected to a radial face of said second side by concave curved surfaces with aerodynamic profile;

said tabs are connected to a base projecting on said first side, this base being configured to be supported axially against said guides, when the piston is in said second position, in order to precisely define this second position; this first side is preferably profiled to limit turbulence and pressure losses in the flow of the fluid;

the first seal is located in an external annular gorge of the head which is formed in an external cylindrical surface of the head;

said fingers extending in the axially extension of said external cylindrical surface;

said lugs project from an external annular rim of the head, and in particular from an annular surface of this rim which has a convex rounded shape in axial cross-section;

said rim has a maximum external diameter less than an internal diameter of said shoulder and said lugs have radially external ends which are located on a circumference centred on the axis A which has a diameter between the internal diameter of said shoulder and its external diameter;

the number of lugs is between 2 and 10, and preferably between 2 and 4;

each of the lugs 166 has a circumferential extent about said axis A that is between 5 and 60°, the total sum of the circumferential extents of the lugs represents preferably at most 180°;

said guides meet at the level of said axis;

said elastic element is mounted fitted around said tabs, and is preferably a compression helical spring;

said elastic element is in axial support on said guides, each of which may comprise a radial stop on said element;

The present invention also relates to a pipe for a fluid circuit, in particular an automotive one, comprising a valve as described above, which is inserted in:

a section of this pipe, preferably after plastic deformation of the latter in order to enlarge its internal diameter, or a bore of a block attached, for example by brazing or welding, to one end of the pipe. An annular attachment flange can be integrated into this block to allow its attachment, by at least one attachment element, to a complementary annular flange. Alternatively, the bore of the block can form a female end-piece, on the side opposite the pipe, intended to receive a complementary male end-piece from another pipe. An elastic snap-fit system can be mounted on the block and allow the axial retaining of the end-pieces within each other.

The present invention also relates to a vehicle, comprising at least one valve or a pipe as described above.

BRIEF DESCRIPTION OF FIGURES

The invention will be better understood and other details, characteristics and advantages of the present invention will become clearer from the following description made by way of non-limiting example and with reference to the attached drawings, in which:

FIG. 1 is a schematic perspective view of a fluidic connection device according to a first embodiment of the invention;

FIG. 2 is a schematic view of the device of FIG. 1 in axial cross-section;

FIG. 3 is a schematic perspective view of pipes of the device of FIG. 1;

FIG. 4 is a schematic perspective view of a non-return insert valve of the device of FIG. 1;

FIG. 5 is a schematic perspective view in axial cross-section of one of the pipes of the device of FIG. 1;

FIG. 6 is a schematic perspective view in axial cross-section of the other pipe of the device of FIG. 1;

FIG. 7 is a schematic axial cross-sectional view of a body of the valve of FIG. 4;

FIG. 8 is a schematic perspective view of a ring of the valve of FIG. 4;

FIG. 9 is a schematic perspective view of a piston of the valve of FIG. 4;

FIG. 10 is another schematic perspective view of the piston of the valve of FIG. 4;

FIG. 11 is a schematic perspective view of the piston, a seal and an elastic member of the valve of FIG. 4;

FIG. 12 is a schematic perspective view of the piston, the seal, the elastic member and the ring of the valve of FIG. 4;

FIG. 13 is a schematic axial cross-sectional view of the valve of FIG. 4, and represents a closed position of the valve;

FIG. 14 is a schematic cross-sectional view along the line XV-XV of FIG. 13;

FIG. 15 is a schematic axial cross-sectional view of the valve of FIG. 4, and represents an open position of the valve;

FIG. 16 is a schematic view in axial cross-section of an alternative embodiment of a fluidic connection device according to the invention;

FIG. 17 is a schematic perspective view of a tubular end-piece of the device of FIG. 16;

FIG. 18 is a schematic perspective view of the tubular end-piece and a flange of the device of FIG. 16;

FIG. 19 is a schematic axial cross-sectional view of another alternative embodiment of a fluidic connection device according to the invention;

FIG. 20 is a schematic perspective and axial cross-sectional view of a pipe and a flange of the device of FIG. 19;

FIG. 21 is a schematic perspective view in axial cross-section similar to that of FIG. 12, and represents an alternative embodiment of the device; and FIG. 22 is a schematic view in axial cross-section of another embodiment of the device.

DETAILED DESCRIPTION OF THE INVENTION

FIGS. 1 to 17 illustrate a first embodiment of a fluidic connection device 10 for a fluid circuit, as well as a non-return insert valve 100 for such a device or such a circuit. This device 10 is advantageously of the autonomous or non-controlled type.

FIGS. 1 and 2 show the device 10 in its entirety. This device 10 comprises:
- a first pipe 12 and a second pipe 14,
- a first flange 16 mounted around the first pipe 12, and a second flange 18 mounted around the second pipe 14,
- at least one element 20 for attaching the flanges 16, 18, and
- the valve 100 which is inserted in the first pipe 12.

FIGS. 3, 5 and 6 illustrate the pipes 12, 14 and show details of these pipes. FIGS. 4 and 7 to 15 illustrate the valve 100 and show components and details of this valve.

The different parts of the device 10 will now be described one after the other.

The first pipe 12 is partially shown in the drawings. It can have any shape, for example straight, bent or curved. The pipe 12 is tubular and has a circular passage cross-section in the example shown.

The pipe 12 is made of a plastically deformable material, for example metal. The plastic deformability of the pipe 12 allows, for example, the expansion of its internal diameter.

The pipe 12 comprises a main section 22 with an internal diameter D1 and a secondary section 24 with at least one internal diameter D2 larger than D1. In the illustrated example, the secondary section 24 comprises a first segment 24a of internal diameter D2' greater than D1, and a second segment 24b of internal diameter D2 located between the main section 22 and the first segment 24a, D2 being greater than D1 and less than D2'.

The secondary section 24 is located at one end of the first pipe 12 and connected to the main section 22 by a first shrinkage 25a. A second shrinkage 25b separates the first and second segments 24a, 24b.

The pipe 12 comprises a first external annular collar 26 which is preferably located at an axial end of the pipe 12 and of the section 24.

The second pipe 14 is partially shown in the drawings. It can have any shape, for example straight, bent or curved. The pipe 14 is tubular and has a circular passage cross-section in the example shown.

The pipe 14 is preferably made of a plastically deformable material, for example metal. The plastic deformability of the pipe 14 allows, for example, the modification of its external diameter.

The pipe 14 comprises an end section 28 of external diameter D3 that is configured to be engaged along an axis A with the secondary section 24 of the first pipe 12. D3 is equal to or slightly lower than D2' or even D2.

The pipe 14 comprises an external cylindrical shoulder 30 which is here formed by a second external annular collar 32.

In the example shown, the collar 32 is located at an axial distance from the free end 28a of the end section 28 located on the side of the pipe 12.

The collar 32 is obtained by plastic deformation of the pipe 14. The collar 32 is formed by an external annular swelling 34 whose facing annular walls 34a are axially tightened one against the other so that the collar 32 has an axial thickness E1 greater than a radial thickness E2 of the pipe 14.

The collar 32 comprises an annular face 32a located on the side of the free end 28a, and an annular face 32b located on the opposite side and forming the aforementioned shoulder 30.

As can be seen in FIGS. 2 and 3, the pipe 14 forms or comprises an end-piece engaged in the pipe 12. More precisely, the end section 28 is engaged in the secondary section 24 and more precisely in the first segment 24a of this secondary section 24.

The engagement of the sections 28, 24 is made along the axis A until the collars 26, 32 are in axial support one against the other, either directly or by means of an annular seal 36. The seal 36 is then interposed axially between the collar 26 and the face 32a of the collar 32.

The flange 16 is mounted around the pipe 12 and in particular around the secondary section 24 of the pipe 12.

In the example shown, the flange 16 is formed in one part and comprises a first orifice 16a crossed by the secondary section 24. As shown in FIG. 2 in particular, the orifice 16a comprises an internal diameter adapted to the external diameter of the section 24. At one axial end, the orifice 16a may open into an annular groove 16b intended to receive the collar 26. The flange 16 is supported axially on the collar 26 or the collar 26 is in axial support on the flange 16.

The flange 16 further comprises a supporting face 38 on the other flange 18. This face 38 extends in a plane perpendicular to the axis A.

The flange 16 further comprises at least one hole 40 for receiving the attachment element 20. The flange 16 may further comprise at least one hole 42 for receiving or mounting a centring finger (not shown) carried or intended to cooperate with the other flange 18.

The flange 16 is preferably mounted on the pipe 12 prior to its plastic deformation. The plastic deformation of the pipe 12 can preferably be used to ensure the attachment and the maintaining of the flange 16 to the pipe, in the manner of a crimping. Alternatively or as an additional characteristic, the flange 16 could be welded or brazed to the pipe 12.

The flange 18 is mounted around the pipe 14 and in particular around the end section 28 of the pipe 14.

In the example shown, the flange 18 is formed in one part and comprises a first orifice 18a crossed by the end section 28. As shown in FIG. 2 in particular, the orifice 18a comprises an internal diameter adapted to the external diameter of the section 28. The flange 18 is supported axially on the collar 32 or the collar 32 is in axial support on the flange 18.

The flange 18 further comprises a supporting face 44 on the face 38 of the other flange 16. This face 44 extends in a plane perpendicular to the axis A.

The flange 18 further comprises at least one orifice 46 for receiving the attachment element 20. The flange 18 may further comprise at least one hole 48 for receiving or mounting the aforementioned finger (not shown).

Alternatively or as an additional characteristic, the flange 18 could be welded or brazed to the pipe 14.

As can be seen in FIG. 2, the faces 38, 44 of the flanges 16, 18 are axially applied to each other and the orifices 40, 46 are aligned so that the attachment element 20 can be engaged therein.

This attachment element 20 is for example a screw or a bolt, whereby the holes 40, 46 can be at least partly threaded.

The attachment and the axial tightening of the flanges 16, 18, in a connecting plane substantially perpendicular to the axis A, allows the collars 26, 32 to be brought closer to each other and to maintain the pipes 12, 14 engaged in each other. It also allows the seal 36 to be tightened axially and ensures the sealing of the assembly.

The valve 100 is mounted within the secondary section 24 of the pipe 12, and more precisely in the first segment 24a, and is located axially between the shrinkage 25a and the end section 28 of the pipe 14. It is therefore located here at an axial distance from the free end and the collar 26 of the pipe 12.

The valve 100 comprises essentially four parts:
a tubular body 102,
a ring 104 attached to an axial end of the body 102,
a piston 106 mounted in the body 102, and
an elastically deformable member 108 biasing the piston 106 into a closed position of the valve 100.

The body 102, the ring 104 and the piston 106 are preferably made of plastic material, either filled or unfilled. Alternatively, at least some of these parts could be made of metal.

FIG. 7 represents the body 102 alone. FIG. 8 shows the ring 104 alone, and FIGS. 9 and 10 represent the piston 106 alone.

The body 102 has a tubular shape with a main axis intended to be aligned with the axis A when the valve 100 is inserted into the pipe 12.

The body 102 comprises an external cylindrical surface 102a configured to be surrounded by the internal cylindrical surface 24b1 of the segment 24b of the pipe 12.

In the example represented, the body 102 comprises at least one annular anchoring rib or stub 110 projecting from this surface 102a. This rib 110 extends around the axis A and is intended to cooperate with the surface 24b1 to prevent, in operation, any translational displacement of the valve 100 in the pipe 12.

The body 102 may comprise an annular gorge 112 for receiving an annular seal 114 visible in particular in FIG. 2. This gorge 112 is formed on the surface 102a and is located, for example, at an upstream axial end of the body 102, with reference to the flow of the fluid in the valve (according to the arrow F in FIG. 2). However, the seal 114 is optional and depends on the pressure of the fluid. It may be necessary when the fluid is considered as being at high pressure (HP) and unnecessary when the fluid is considered as being at low pressure (LP).

At its downstream end, the body 102 comprises an annular row of notches 116 that extend both in axial direction from the free downstream end of the body and in radial direction to pass through the entire radial thickness of the body 102. These notches 116 define between them lips 118 that are elastically deformable in radial direction. The number of lips 118 is for example between 5 and 15. They are regularly distributed around the axis A.

At its downstream end, the body 102 further comprises an internal annular groove 120 which is here formed in the lips 118.

The body 102 further comprises an internal annular rim 122, an internal annular seat 124, and an internal cylindrical shoulder 126.

In the example shown, the rim 122, the seat 124, and the shoulder 126 are all gathered on the upstream end side of the body 102. The shoulder 126 may moreover be located on one side (here downstream) of the rim 122, and the seat 124 may extend or be located between the rim 122 and the shoulder 126.

For example, the rim 122 is located substantially in line with the gorge 112. The rim 122 comprises at its internal periphery a substantially cylindrical surface 128 that has an internal diameter Q1.

The shoulder 126 is oriented downstream and has an internal diameter Q2 and an external diameter Q3.

Here, the seat 124 is formed by a frustoconical surface 130 that extends from the surface 128 downstream to the upstream end of a cylindrical surface 132, the downstream end of which is connected to the internal periphery of the shoulder 126. The surface 130 is flared downstream. In other words, the seat 124 has an internal diameter Q1 and an external diameter Q2.

In the example shown, the surface 128 may be connected upstream to another frustoconical surface 134, which is this time flared upstream.

The ring 104 is mounted at least partly in the body 102. Alternatively, it could be mounted at least partly on the body 102.

In the example shown, the ring 104 is mounted in the body 102 by elastic snap-fit. To this end, the ring 104 comprises an external cylindrical surface 104a intended to be engaged in the downstream end of the body 102 and to be surrounded by the lips 118, as well as an annular rib 136 intended to be engaged in the groove 120 of these lips 118.

At its downstream end, the ring 104 comprises an external annular rim 138 adapted to be supported axially on the free downstream end of the body 102.

The ring 104 comprises guides 140 extending in a radial direction with respect to the axis A. These guides 140 are here three in number and form a cross or a three-branches star. The guides 140 extend from an internal cylindrical surface 104b of the ring 104 to the axis A and meet at the level of that axis.

Each of the guides 140 has two side walls 140a parallel to each other and to the axis A. On the upstream side, the guides 140 each comprises a radial stop 142 oriented towards the axis A.

The piston 106 comprises a head 144 carrying an annular seal 146 configured to come in support on the seat 124. To this end, the head 144 comprises an external annular gorge 148 that is formed here on an external cylindrical surface 150 of the head.

The piston 106 further comprises at a first axial side, herein downstream, tabs 152 extending axially downstream and configured to slidably cooperate with the guides 140.

The tabs 152 extend downstream from the head 144 and are three in number in the example shown. They each have a general elongated shape along the axis A and are evenly distributed around this axis. The upstream ends of the tabs 152 are connected to the head 14 by a central base 154 that projects from a downstream radial face 144a of the head 144.

The tabs 152 each comprise a longitudinal surface 152a oriented radially outwardly that is convexly rounded. The surfaces 152a of the tabs extend around a circumference centred on the axis A, which has a diameter G1.

The tabs 152 each comprise two bevelled surfaces 152b and oriented radially inward. These surfaces 152b are intended to cooperate by sliding with the side walls 140a of the guides 140, as illustrated in FIG. 12 in particular. The guides 140 thus allow to guide the piston 106 in translation by limiting the friction and the rotation of the piston potentially noisy.

Finally, the tabs 152 have their free downstream ends that are also bevelled and comprise an end face 152c inclined to facilitate the insertion and the guiding of the tabs 152 between the guides 140 of the ring 104 during the assembly of the valve 100.

In the open position of the valve 100 shown in FIG. 15, the piston 106 is located downstream and its end-of-stroke position is positively and precisely defined by axial support of the base 154 on the guides 140 (FIG. 15).

The member 108 can be mounted fitted around the tabs 152 and then has an internal diameter equal to or close to G1 (FIGS. 11 and 12). The member 108 extends about the axis A and is interposed axially between the head 144 and the ring 104. In the example shown, it is supported upstream on the face 144a and downstream on the guides 140.

As can be seen in FIGS. 13 and 15 in particular, the upstream end of the member 108 is engaged in an annular recess 156 of the head, the internal diameter G2 of which is greater than the external diameter of the member 108.

Alternatively, and as illustrated in FIG. 21, this end of the member 108 could be supported on radial ribs 155a, 155b projecting into the recess 156. Some of these ribs 155a could be axially aligned with the tabs 152, and extend into their extension. Other of these ribs 155b could be interposed between the ribs 155a and connected to the base 154. In the example shown, the ribs 155a have a circumferential width or extent about the axis A that is greater than that of the ribs 155b.

The downstream end of the member 108 is surrounded by the stops 142, which extend around a circumference whose diameter G3 is greater than the external diameter of the member 108.

The member 108 is preferably a compression helical spring as in the example shown.

The piston 106 further comprises at a second axial side, herein upstream, fingers 158 extending axially upstream and configured to slidingly cooperate with the rim 122 and in particular its surface 128.

The fingers 158 extend upstream from the head 144 and are three in number in the example shown. They each have a general elongated shape along the axis A and are evenly distributed around this axis. The downstream ends of the fingers 158 are connected to an upstream face 144b of the head.

The fingers 158 each comprise a longitudinal surface 158a oriented radially outward, which is convexly rounded, and here extends as an extension of the surface 150. This surface 150 has a diameter G4 slightly smaller than the diameter Q1, as can be seen in FIG. 13 in particular, so that the surfaces 158a, 150 can slide on the surface 128 of the rim 122 in operation during the displacement of the piston 106.

The fingers 158 are located at an external periphery of the head 144 and are each connected to a projecting edge 160 on the aforementioned face 144b.

These edges 160 extend radially with respect to the axis A from the fingers 158 and meet at the level of this axis A (FIG. 9).

The edges 160 are connected to the face 144b by concave curved surfaces 162 with an aerodynamic or aeraulic profile to limit the turbulences and pressure losses in the flow of the fluid. This side of the head 144 is the upstream side of the piston 106 which is intended to face the fluid as it flows through the valve 100 (arrows F).

The head 144 of the piston 106 further comprises an external annular rim 164 on which lugs 166 are located projecting and extending radially outward.

The number of lugs 166 is between 2 and 10, and preferably between 2 and 4. In the example shown, the lugs 166 are three in number and are evenly distributed around the axis A.

The rim 164 has an external diameter G5 and the lugs 166 extend from this diameter G5, and their radially external ends are located on a circumference having a diameter G6 (see FIG. 14).

In the embodiment shown in FIG. 14, each of the lugs 166 has a circumferential extent a about the axis A of between 5 and 30°, and preferably between 10 and 20°. The total sum of the circumferential extents α of the lugs 166 represents preferably at most 90°, such that the circumferential free spaces between the lugs 166 represent at least 270°.

In the alternative embodiment shown in FIG. 21, each of the lugs 166 has a circumferential extent α' about the axis A of between 30° and 60°, and preferably between 30° and 50°. The total sum of the circumferential extents α' of the lugs 166 is preferably at most 180°, so that the circumferential free spaces between the lugs 166 are at least 180°.

As can be seen in FIG. 13 in particular, G5 is less than Q2 and G6 is greater than Q2 and less than Q3. In this way, the lugs 166 are adapted to be supported axially on the shoulder 126. This support allows to define in a positive and precise way the rest position of the piston 106 and the closing position of the valve 100. In this position, the seal 146 is in axial support on the seat 124. The lugs 166 thus protect the seal 146, limiting its axial crushing, while limiting the pressure losses and thus reducing the energy consumption of the circuit in a reduced space.

Preferably, as illustrated in particular in FIG. 10, the rim 164 comprises an external annular surface 164a that has a convex rounded shape in axial cross-section to optimize the flow of the fluid. This is also preferably the case with the lugs 166, each of which comprises a convexly rounded external surface 166a.

As discussed above, the piston 106 of the valve 100 is thus axially movable from the closed position illustrated in FIG. 13 in which the seal 146 is in axial support on the seat 124 and the lugs 166 are in support on the shoulder 126, to the open position of the valve 100 illustrated in FIG. 14 in which the seal 146 is axially spaced from the seat 124 and the base 154 is supported on the guides 140.

The displacement of the piston 106 is intended to be caused by the fluid, which is intended to apply a force on the upstream side of the head of the piston 106, which is greater than an elastic return force imposed by the member 108. This force required to the opening of the valve 100 corresponds, for example, to a pressure of the fluid below 100 mbar.

The device 10 according to the invention may be assembled as follows. The flange 16 is engaged on the pipe 12 and the flange 18 is engaged on the pipe 14. Each of the pipes 12, 14 is plastically deformed to change its internal or external diameter as discussed above. The valve 100 is then engaged by force into the secondary section 24 of the pipe 12, up to its segment 24b. Once embedded in the pipe 12, the valve 100 is preferably non-removable. In fact, the disassembling of the ring 104 by extraction of the body 102 is no longer possible because the lips 118 of the body are supported on the surface 24b1 of the pipe 12 and can no longer be elastically deformed outward so as to allow the axial translation downstream of the ring 104. This ring 104 ensures the maintain of the other elements of the valve 100. The section 28 of the pipe 14 is then engaged in translation in the section 24 of the pipe 12 and in particular in its segment 24a. The flanges 16, 18 are positioned so that their holes 40, 46 are aligned. For this purpose, the holes 42, 48 of the flanges 16, 48 can receive a guiding finger, as mentioned above. The attachment element 20 is engaged in the holes 42, 48 and allows the flanges 16, 18 to be tightened axially one against the other and ensure the axial tightening of the seal 36. The valve 10 is trapped axially in the pipe 12, between its shrinkage 25a and the free end 28a of the other pipe 14.

FIGS. 16 to 18 illustrate a first alternative embodiment of the device 10 in which the pipe 12, the flange 16 and the valve 100 are substantially identical to the previous embodiment of FIGS. 1 to 15.

The end section 28 is here formed by a tubular end-piece 50 which is intended to be fitted and attached to a free end of a pipe (not shown). This attachment can be done by welding for example.

The flange 18 is similar to the one described above, but its orifice 18a is here crossed by the end-piece 50 and not by the pipe 14.

The end-piece 50 comprises two segments 52, 54 with the same internal diameter but different external diameters.

The end-piece 50 comprises a first segment 52 defining the end section 28 and intended to be engaged in the secondary section 24. This first segment 52 thus has an external diameter D3. This first segment 52 here comprises an external cylindrical surface on which are formed annular gorges 56 for mounting annular seals 58.

The end-piece 50 comprises a second smaller diameter segment 54 intended to pass through the orifice 18a of the flange 18.

The downstream end of the first segment 52 defines the aforementioned cylindrical shoulder 30 and the flange 18 is intended to be supported axially on this shoulder 30, as seen in FIG. 16. This support can be provided by crimping the end-piece into the orifice of the flange 18a.

When the flanges 16, 18 are axially tightened, the cylindrical shoulder 30 is brought closer to the collar 26 and even comes in the radial plane in which the downstream face of this collar 26 extends.

The axial sealing provided by the seal 36 in the previous embodiment is here replaced by a radial sealing provided by the seals 58. These seals 58 cooperate with the internal cylindrical surface of the section 24 and of its segment 24a.

FIGS. 19 and 20 illustrate another alternative embodiment of the device 100 in which the pipe 12, the flange 16, and the valve 100 are substantially identical to the first embodiment of FIGS. 1 to 15.

The end section 28 is formed here by the pipe 14 which comprises on its external cylindrical surface an annular gorge 60 for receiving an annular seal (not shown).

As in the previous variant, this seal provides a radial sealing of the assembly.

The pipe 14 is plastically deformed to make the cylindrical shoulder 30 and preferably also to ensure the attachment by crimping of the flange 18, which is similar to that of the first embodiment.

The flange 18 is intended to be supported axially on this shoulder 30 as shown in FIG. 19. This support can be provided by crimping the pipe 14.

When the flanges 16, 18 are axially tightened, the cylindrical shoulder 30 is brought closer to the collar 26 and even comes in the radial plane in which the downstream face of this collar 26 extends.

FIG. 22 shows an alternative embodiment in which the valve 100 is inserted into a bore 168 of a block 170 attached, for example by brazing or welding, to one end of the pipe 12. An annular attachment flange may be integrated with this block 170 to allow it to be attached, by at least one attachment element, to a complementary annular flange.

Alternatively, the bore 168 of the block may form, on the side opposite the pipe 12, a female end-piece 172 intended to receive a complementary male end-piece of another pipe. An elastic snap-fit system could be mounted on the block and allow the axial retaining of the end-pieces within each other.

The valve 100 according to the invention has in particular the advantage of being reversible and of being able to be mounted in either direction in a pipe (either of its axial ends can be engaged first in the pipe). It has for example an external diameter between 10 and 20 mm, or even between 12 and 18 mm.

The device 10 according to the invention has the advantage that it can be equipped with a radial or axial sealing without this having a significant impact on its assembly. In addition, its insert or cartridge type design and its preferably plastic materials, for example injected, allow to reduce the weight, the overall dimension and the cost of the device. The pipes 12, 14 and the end-piece 50 are preferably made of metal, for example aluminium.

The device 10 and the valve 100 according to the invention are particularly adapted to equip a fluid circuit for a vehicle, the circuit being, for example, an air-conditioning circuit and the valve is, for example, mounted between an expander and a compressor of this circuit.

The fluid is for example R134a or R1234yf. The fluid can be in liquid or gaseous form and can be at low or high pressure.

The invention claimed is:

1. A fluidic connection device for a fluid circuit, this device comprising:
    a first pipe comprising a main section of an internal first diameter (D1) and a secondary section having at least one internal second diameter (D2) greater than the first diameter (D1), the secondary section being located at one end of the first pipe and connected to the main section by a first shrinkage, this first pipe being made of a plastically deformable material and comprising a first external annular collar,
    a tubular end-piece comprising an end section of an external third diameter (D3) which is configured to be engaged along an axis in the secondary section of the first pipe, this end-piece comprising an external cylindrical shoulder,
    a first flange mounted around the secondary section of the first pipe and comprising a first orifice crossed by this secondary section, this first flange being configured to be supported axially on the first collar,
    a second flange mounted around the end-piece and comprising a second orifice crossed by this end-piece, this second flange being configured to be supported axially on the cylindrical shoulder, the first and second flanges being configured to be tightened one against the other in a connecting plane substantially perpendicular to said axis so as to bring the first collar closer to said cylindrical shoulder and to maintain the end-piece engaged in the first pipe,
    at least one element for attaching the first and second flanges one against the other, and
    a non-return insert valve mounted within said secondary section, and located axially between said first shrinkage and said end section,
    wherein said secondary section comprises a first segment of an internal fourth diameter (D2') greater than the first diameter (D1), and a second segment of the internal second diameter (D2) located between the main section and said first segment, the second diameter (D2) being greater than the first diameter (D1) and less than the fourth diameter (D2').

2. The device of claim 1, wherein the first collar is located at a free end of said secondary section.

3. The device of claim 1, wherein an annular seal is axially interposed and tightened between the first collar and the end-piece.

4. The device according to claim 1, wherein said end-piece is fitted and attached to an end of a second pipe.

5. The device according to claim 1, wherein said second flange is crimped to said end-piece.

6. The device according to claim 1, wherein said end-piece is integral with a second pipe which is made of a plastically deformable material.

7. The device according to claim 6, wherein said cylindrical shoulder is formed by a second external annular collar located at an axial distance from a free end of said end section.

8. The device according to claim 7, wherein said second collar is obtained by plastic deformation of the second pipe, this collar being formed by an external annular swelling, the facing annular walls of which are axially tightened one against the other so that the second collar has an axial thickness greater than a radial thickness of the second pipe.

9. The device of claim 1, wherein said end section comprises at least one external annular gorge for housing an annular seal configured to cooperate with an internal annular surface of said secondary section.

10. The device of claim 1, wherein said at least one attachment element comprises a screw or a bolt that passes through holes facing said first and second flanges.

11. The device according to claim 1, wherein said first and second segments are connected together by a second shrinkage of the first pipe.

12. The device of claim 1, wherein the valve is mounted within the second segment and the end section is mounted within the first segment.

13. An air-conditioning circuit, comprising the fluidic connection device according to claim 1.

* * * * *